United States Patent
Matsuda (10) Patent No.: US 6,559,990 B1
(45) Date of Patent: May 6, 2003

(54) OPTICAL DELAY CIRCUIT HAVING OPTICAL LOOP FOR REPEATEDLY INTRODUCING DELAY TIME BETWEEN INPUT DATA AND OUTPUT DATA AND METHOD USED THEREIN

(75) Inventor: Kazuhiko Matsuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/373,235

(22) Filed: Aug. 12, 1999

(30) Foreign Application Priority Data

Aug. 13, 1998 (JP) .......................................... 10-229007

(51) Int. Cl.[7] .............................................. H04J 14/08
(52) U.S. Cl. .................... 359/140; 359/123; 359/139
(58) Field of Search ................................ 359/140, 139, 359/138, 135, 123, 187, 174

(56) References Cited

U.S. PATENT DOCUMENTS

| | | | | |
|---|---|---|---|---|
| 5,005,166 A | * | 4/1991 | Suzuki et al. ............... | 359/123 |
| 5,414,548 A | * | 5/1995 | Tachikawa et al. .......... | 359/130 |
| 5,506,713 A | * | 4/1996 | Okamoto et al. ............ | 359/123 |
| 5,953,142 A | * | 9/1999 | Chiaroni et al. ........ | 359/140 X |
| 5,978,120 A | * | 11/1999 | Dumortier ................... | 359/140 |

FOREIGN PATENT DOCUMENTS

JP            63-209395            8/1988

* cited by examiner

*Primary Examiner*—Thomas Mullen
(74) *Attorney, Agent, or Firm*—Foley & Lardner (57) ABSTRACT

An optical delay circuit includes an optical loop for repeatedly introducing a unit time delay into propagation of parts of an input optical signal representative of pieces of data information; when the optical loop introduces a time delay to be required for one of the parts, a controller instructs an optical switch inserted in the optical loop to transfer the part to an output optical circuit so that the optical delay circuit occupies small space.

9 Claims, 4 Drawing Sheets

OPTICAL DELAY CIRCUIT HAVING OPTICAL LOOP FOR REPEATEDLY INTRODUCING DELAY TIME BETWEEN INPUT DATA AND OUTPUT DATA AND METHOD USED THEREIN

FIELD OF THE INVENTION

This invention relates to an optical delay circuit and, more particularly, to an optical delay circuit available for an optical exchanger incorporated in an optical communication system and a method used in the optical delay circuit.

DESCRIPTION OF THE RELATED ART

Figure 1:
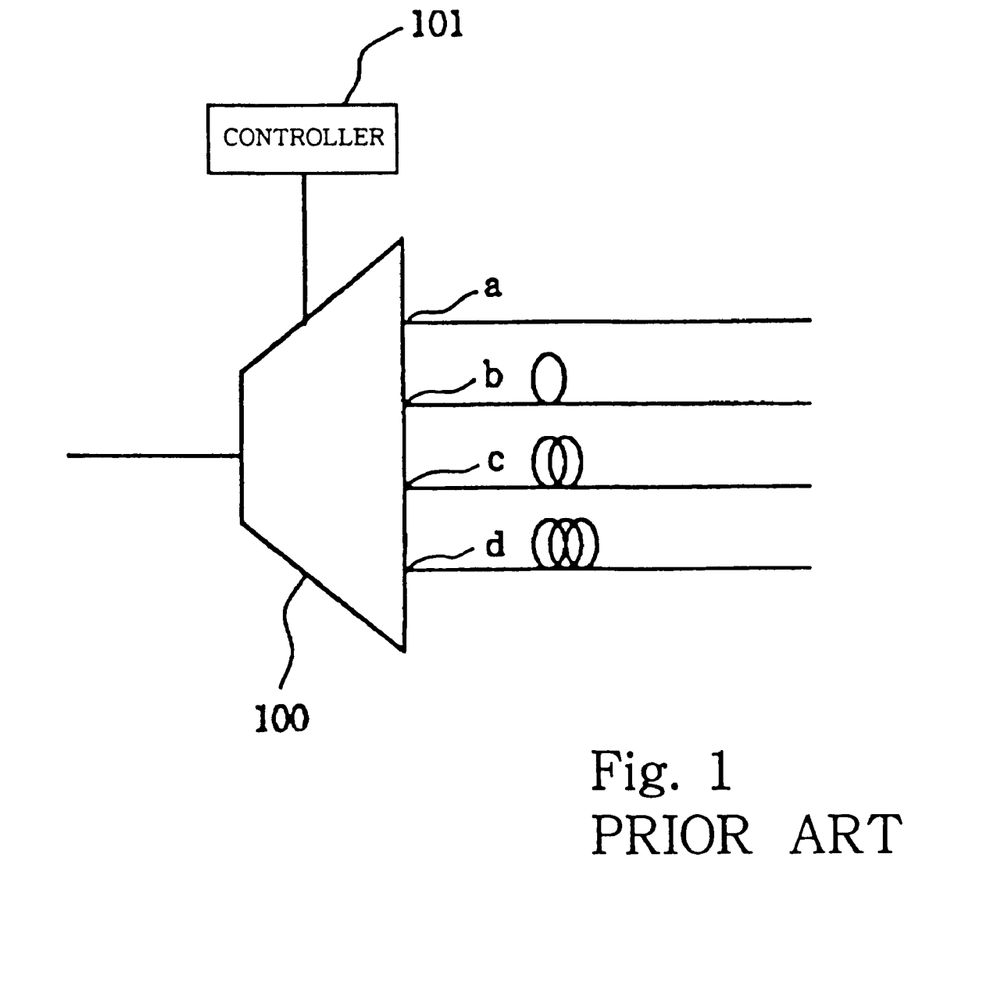
FIG. 1 is a schematic view showing the prior art optical delay circuit.

A typical example of a prior art optical delay circuit is illustrated in FIG. 1 of the drawings. The prior art optical delay unit is broken down into an optical switching element 100 and a controller 101. The optical switching element 100 has a single input port and four output ports, i.e., the first output port a, the second output port b, the third output port c and the fourth output port d, and the input port is connected through four optical fibers (not shown) to the first, second, third and fourth output ports a/b/c/d. The optical delay element 100 is responsive to an instruction of the controller 101 so as to selectively transfer an optical signal from the input port through the optical fibers to the first, second, third and fourth output ports a/b/c/d.

An input optical signal line is connected to the input port, and output optical signal lines are respectively connected to the first, second, third and fourth output ports a/b/c/d. Time on the input optical signal line is divided into frames, and each frame is further divided into time slots. The first optical fiber does not introduce any time delay into the propagation to the first output port a. However, the other optical fibers introduce delay times different from one another. The second optical fiber introduces a time delay equal to a single time slot into the propagation from the input port to the second output port b, and the third optical fiber introduces a time delay twice as long as the time slot into the propagation from the input port to the third output port c. The fourth optical fiber introduces a time delay three times as long as the time slot into the propagation from the input port to the fourth output port d. The controller 101 instructs the optical delay element 100 to steer the optical signal to one of the first, second, third and fourth optical fibers.

Figure 2:
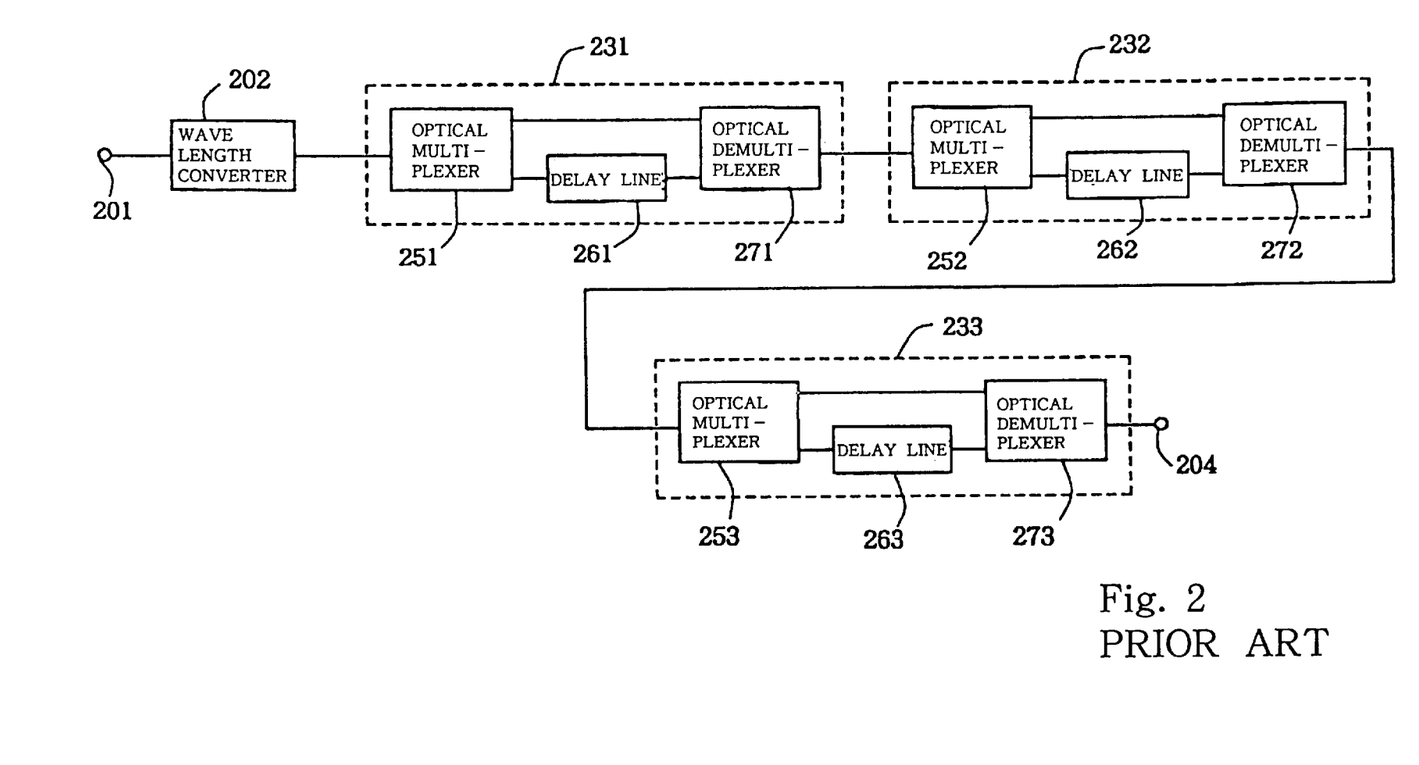
FIG. 2 is a circuit diagram showing the prior art optical switch disclosed in Japanese Patent Publication of Unexamined Application No. 63-209395.

An optical time switch is disclosed in Japanese Patent Publication of Unexamined Application No. 63-209395, and is illustrated in FIG. 2 of the drawings. The prior art optical time switch has an input terminal 201, and a wavelength converter 202 is connected to the input terminal 201. The wavelength converter 202 converts the wavelength of an optical signal to one of the different wavelengths λ0, λ1, λ2, λ3, λ4, λ5, λ6 and λ7. When a multiple optical signal is supplied to the wavelength converter 202 as a frame divided into plural time slots, the wavelength converter 202 converts the wavelength of the pieces of multiple optical signal in the plural time slots to the wavelengths λ0, λ1, λ2, λ3, λ4, λ5, λ6 and λ7, respectively. Between the input terminal 201 and an output terminal 204 are serially connected optical delay circuits 231, 232 and 233 which are similar in circuit configuration to one another.

An optical multiplexer 251, an optical delay line 261 and an optical demultiplexer 271 form in combination the optical delay circuit 231. The optical multiplexer 251 is of the type having a single input port and two output ports, and the optical demultiplexer 271 has two input ports and a single output port. The input port of the optical multiplexer 251 is connected to the wavelength converter 202, and two output ports thereof are connected to the optical delay line 261 and one of the input ports of the optical demultiplexer 271, respectively. The optical delay line 261 introduces a delay time 4T into the propagation from the optical multiplexer 251 to the optical demultiplexer 271, and supplies the delayed optical signal to the other of the input ports of the optical demultiplexer 271.

The optical delay circuit 232 also includes an optical multiplexer 252, an optical delay line 262 and an optical demultiplexer 272, which are arranged as similar to the optical multiplexer 251, the optical delay line 261 and the optical demultiplexer 271. An optical multiplexer 253, an optical delay line 263 and an optical demultiplexer 273 also form in combination the optical delay circuit 233, and are arranged as similar to those of the optical delay circuit 231. Thus, the optical delay circuits 231, 232 and 233 are similar in circuit configuration to one another. However, the optical delay lines 261, 262 and 263 introduce different delay times into the propagation of the optical signal from the associated optical multiplexers 251, 252 and 253 to the associated optical demultiplexers 271, 272 and 273.

A single bit of the optical signal occupies a time T, and each frame occupies a time period 8T. The optical delay line 261 introduces the delay time equal to 4T. The optical delay line 262 introduces the delay time, which is equal to a half of the delay time introduced by the optical delay line 261, i.e., 2T. The optical delay line 263 introduces the delay time, which is equal to a quarter of the delay time introduced by the optical delay line 261, i.e., T.

A multiple optical signal contains pieces of data information on eight channels A, B, C, D, E, F, G and H, and the pieces of data information on the eight channels A, B, C, D, E, F, G and H are respectively assigned to the eight time slots. Assuming now that the multiple optical signal is supplied to the input terminal 201, the wavelength converter 202 converts the eight pieces of the multiple optical signal respectively occupying the eight time slots to optical signals with the wavelengths λ0, λ1, λ2, λ3, λ4, λ5, λ6 and λ7. The optical signals are supplied to the series of optical delay circuits 231, 232 and 233. The optical signals are suitably multiplexed, delayed and demultiplexed, and are rearranged in a different order. The multiple optical signal at the output terminal 204 carries the pieces of data information put in a different order H, F, C, G, A, D, E and B, by way of example. Thus, the prior art optical time switch achieves an exchange of time slots.

The prior art optical delay circuit shown in FIG. 1 introduces the different delay times through the individual optical fibers. The prior art optical delay circuit shown in FIG. 1 outputs three delayed optical signals at the output ports b, c and d, and, accordingly, three optical fibers are incorporated in the optical delay element 100. When the prior art optical delay circuit is to be designed to produce n delayed optical signals, the optical delay element 100 requires n output ports and, accordingly, n optical fibers. The longer the delay time is, the longer the optical fiber becomes. If n is much greater than three, the optical delay element 100 becomes huge due to n optical fibers and, especially the nth optical fiber much longer than the first optical fiber. Thus, the problem inherent in the prior art optical delay circuit is the volume increased together with the number of delayed optical signals.

The prior art optical time switch differently retards the optical signals with different wavelengths. The pieces of data information are assigned to the different time slots, and are converted to the optical signals different in wavelength. Each of the optical delay circuits 231, 232 and 233 generates two optical signals. If the multiple optical signal occupies n1 time slots, the prior art optical time switch requires n2 optical delay circuits satisfying the relation of $n1=2^{n2}$. As a result, if the multiple optical signal occupies a large number of time slots, the prior art optical time switch also becomes huge.

SUMMARY OF THE INVENTION

It is therefore an important object of the present invention to provide an optical delay circuit, which is still small under the conditions that an optical frame comprises a large number of time slots.

It is also an important object of the present invention to provide a method used in the optical delay circuit.

To accomplish the object, the present invention proposes to repeatedly use a waveguide as a delay line introducing unit delay time during generation of an output optical signal.

In accordance with one aspect of the present invention, there is provided an optical delay circuit for successively introducing delay times respectively equal to multiples of a unit time between parts of an input optical signal and an output optical signal, and the optical delay circuit comprises a first optical multiplexer having a first input port successively supplied with the parts of the input optical signal representative of pieces of data information at a predetermined wavelength and a second input port successively supplied with intermediate optical signals each representative of none of or at least one of the pieces of data information at another wavelength different from the predetermined wavelength in synchronism with the parts of the input optical signal and an output port for outputting a multiplexed optical signal representative of the piece of data information on one of the parts of the input optical signal at the predetermined wavelength and the aforesaid at least one of the piece of data information at the aforesaid another wavelength, an optical demultiplexer having an input port connected to the output port of the first optical multiplexer and plural output ports for outputting plural demultiplexed optical signals representative of the aforesaid one of the pieces of data information at the predetermined wavelength and the aforesaid at least one of the pieces of data information at the aforesaid another wavelength, a first wavelength converter having input ports respectively connected to the output ports of the optical demultiplexer and converting the plural demultiplexed optical signals to converted optical signals at the aforesaid another wavelength and yet another wavelength different from the predetermined wavelength and the aforesaid another wavelength, an optical switching unit having input ports respectively connected to output ports of the first wavelength converter and first output ports connectable to the input ports and second output ports also connectable to the input ports and responsive to an instruction so as to selectively connect the input ports to the first output ports and the second output ports, a second wavelength converter having input ports selectively connected to the first output ports and one of the output port of the first wavelength converter and converting the converted optical signals to restored optical signals respectively representative of the pieces of data information at the predetermined wavelength, a second optical multiplexer having input ports respectively connected to the second output ports, and successively producing the intermediate optical signals from the converted optical signal or the converted optical signals selectively supplied from the second output ports, a third optical multiplexer having input ports respectively connected to output ports of the second wavelength converter and producing the parts of the output optical signal from the restored optical signals, a waveguide connected between an output port of the second optical multiplexer and the second input port of the first optical multiplexer and introducing a delay time approximately equal to the unit time into the propagation of each of the intermediate optical signals from the second optical multiplexer to the first optical multiplexer and a controller storing pieces of control data information representative of the delay times and checking the pieces of control data information to see whether or not the optical loop consisting of the first optical multiplexer, the optical demultiplexer, the first wavelength converter, the optical switching unit, the second optical multiplexer and the waveguide retards the pieces of data information by the delay times, respectively, so as to instruct the optical switching unit to selectively change the optical connection from the first output ports to the second output ports.

In accordance with another aspect of the present invention, there is provided a method for introducing time delays equal to different multiples of a unit time between parts of an input optical signal and parts of an output optical signal comprising the steps of a) multiplexing one of the parts of the input optical signal representative of any one of pieces of data information with an intermediate optical signal representative of none of or at least one of the pieces of data information at another wavelength for producing a multiplexed optical signal representative of the aforesaid any one of the pieces of data information at the predetermined wavelength and the aforesaid none of or at least one of the piece of data information at the another wavelength, b) demultiplexing the multiplexed optical signal into plural demultiplexed optical signals representative of the aforesaid any one of the pieces of data information at the predetermined wavelength and the aforesaid none of or at least one of the pieces of data information at the another wavelength, c) converting the demultiplexed optical signals at the predetermined wavelength and the aforesaid another wavelength to converted optical signals at the aforesaid another wavelength and yet another wavelength, d) checking the converted optical signals to see whether or not any one of the converted optical signal is delayed by associated one of the delay time, e) transferring the aforesaid any one of the converted optical signals to a second wavelength converter with a positive answer at the step d) and to a second multiplexer with a negative answer at the step d), f) multiplexing the aforesaid any one of the converted optical signals transferred at the step e) with another of the converted optical signals by means of the second multiplexer for producing the intermediate optical signal, g) propagating the intermediate optical signal from the second multiplexer through a waveguide to the first multiplexer for introducing a unit delay time equal to the unit time during the propagation and h) converting the aforesaid any one of the converted optical signal to a restored optical signal at the predetermined wavelength by means of the second wavelength converter without execution of the steps f) and g) for producing one of the part of the output optical signal when the answer at the step d) is positive.

In accordance with yet another aspect of the present invention, there is provided an optical delay circuit for selectively introducing delay times different from one another between pieces of input optical data and pieces of output optical data comprising an optical path circulating the pieces of input optical data and introducing the delay times during the circulation of the pieces of input optical data, an output optical means for outputting the pieces of output optical data, an optical switching means inserted into the optical path and connected to the output optical means and a controller storing pieces of control data respectively representative of the delay times to be introduced and checking the pieces of control data to see whether or not the optical path retards any one of the pieces of input optical data by the delay time assigned thereto, when the aforesaid any one of the pieces of input optical data is delayed by the delay time, the controller instructs the optical switching means to transfer the aforesaid any one of the pieces of input optical data to the output optical means.

BRIEF DESCRIPTION OF THE DRAWINGS

The features and advantages of the optical delay circuit and the method will be more clearly understood from the following description taken in conjunction with the accompanying drawings in which.

DESCRIPTION OF THE PREFERRED EMBODIMENT

Figure 3:
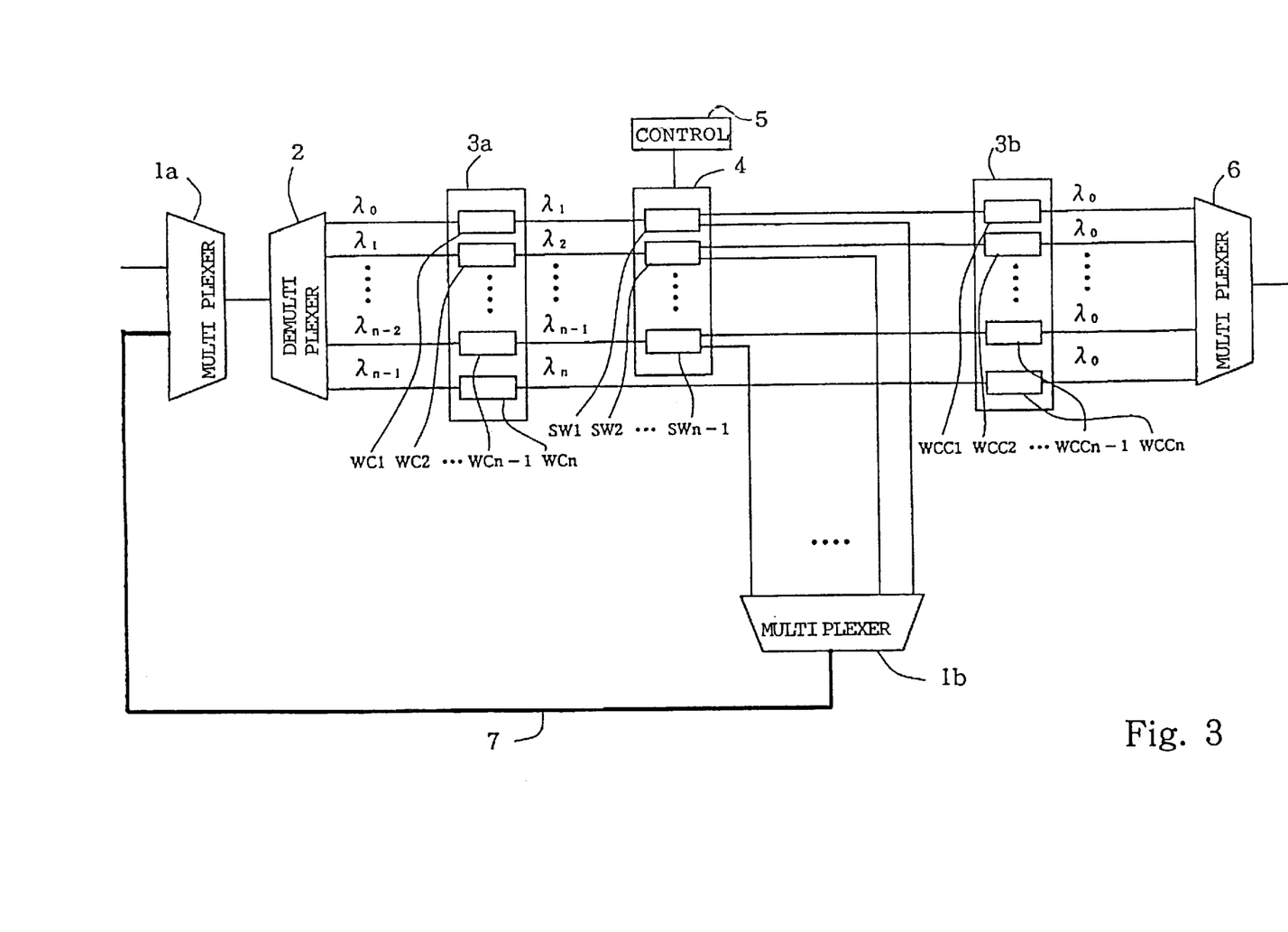
FIG. 3 is a circuit diagram showing the circuit arrangement of an optical delay circuit according to the present invention.

Referring to FIG. 3 of the drawings, an optical delay circuit embodying the present invention is connected between an input optical signal line and an output optical signal line, and comprises a first optical multiplexer 1a, a second optical multiplexer 1b, an optical demultiplexer 2, a first wavelength converter 3a, a second wavelength converter 3b, an optical switching unit 4, a controller 5, a third optical multiplexer 6 and a waveguide 7. A multiple input optical signal is supplied from the input optical signal line to the optical delay circuit according to the present invention, and occupies n time slots on the input optical signal line. The n time slots form each frame for the multiple input optical signal. The multiple input optical signal carries pieces of data information respectively assigned to the n time slots. The optical delay circuit according to the present invention sequentially introduces a unit delay time equal to the single time slot between multiple intermediate optical signals, and, thereafter, multiplexes the multiple intermediate optical signals into a multiple output optical signal. The multiple input optical signal has a wavelength $\lambda 0$, and the multiple intermediate optical signals have different wavelength components $\lambda 1$ to $\lambda n-1$. The circuit components 1a, 1b, 2, 3a, 3b, 4, 5, 6 and 7 are hereinbelow described in detail.

The first optical multiplexer 1a has two input ports and a single output port. On the other hand, the second optical multiplexer 1b has n-i input ports and a single output port. The multiple input optical signal is supplied to one of the input ports of the first optical multiplexer 1a. The other input port of the first optical multiplexer 1a is connected through the waveguide 7 to the output port of the second optical multiplexer 1b. The multiple intermediate optical signals are supplied from the second optical multiplexer 1b through the waveguide 7 to the first optical multiplexer 1a in a predetermined order, and the first optical multiplexer 1a sequentially multiplexes the parts of the multiple optical signal with the multiple intermediate optical signals. Each part of the multiple input optical signal multiplexed with one of the multiple intermediate optical signals is hereinbelow referred to as "multiplexed optical signal".

The optical demultiplexer 2 has a single input port and n output ports. The output port of the first optical multiplexer 1a is connected to the input port of the optical demultiplexer 2. The multiplexed optical signal is supplied from the first optical multiplexer a to the optical demultiplexer 2. The multiplexed optical signal is demultiplexed into internal demultiplexed optical signals. The demultiplexed optical signals have different wavelengths $\lambda 0, \lambda 1, \ldots \lambda n-2$ and $\lambda n-1$, respectively. The n output ports of the optical demultiplexer 2 are respectively assigned to the demultiplexed optical signals.

The first wavelength converter 3a includes n wavelength converting circuits WC1, WC2, ... WCn-1 and WCn, and the wavelength converting circuits WC1 to WCn are respectively connected to the output ports of the optical demultiplexer 2. The demultiplexed optical signals are supplied to the associated wavelength converting circuits WC1 to WCn. The wavelength converting circuits WC1 to WCn converts the demultiplexed optical signals from the wavelengths $\lambda 0$, $\lambda 1, \ldots \lambda n-2$ and $\lambda n-1$ to wavelengths $\lambda 1, \lambda 2, \ldots \lambda n-1$ and $\lambda n$, respectively. The wavelength converting circuits WC1 to WCn produce converted optical signals.

The optical switching unit 4 includes n-1 optical switches SW1, SW2 ... SWn-1. The wavelength converting circuits WC1 to WCn-i are connected to the optical switches SW1 to SWn-1, respectively. However, the wavelength converting circuit WCn is directly connected to the second wavelength converter 3b. Each of the optical switches SW1 to SWn-1 has a single input port and two output ports, and the input port is selectively connected through an optical path to the output ports by the controller 5. The first output ports of the optical switches SW1 to SWn-1 are connected to the second wavelength converter 3b, and the second output ports of the optical switches SW1 to SWn-1 are connected to the second optical multiplexer 1b.

The controller 5 instructs each of the optical switches SW1 to SWn-1 as follows. The frames on the output optical signal line are synchronous with the frames on the input optical signal line. The optical switches SW1–SWn-1 are associated with the pieces of data information of the multiple input optical signal, respectively. The controller 5 stores pieces of control data information respectively representative of delay times from the beginning of each frame on the input optical signal line to the time slots on the output optical signal line to be assigned the respective pieces of data information. When the lapse of time from the beginning for a piece of data information is shorter than its delay time, the controller 5 instructs an associated one of the optical switches SW1 to SWn-1 to connect the input port to the second output port, and the converted optical signal is transferred to the second optical multiplexer 1b. When the lapse of time becomes equal to the delay time, the controller 5 instructs the associated optical switch to change the optical path to the first output port, and the converted optical signal is transferred to the second wavelength converter 3b.

The second wavelength converter 3b includes wavelength converting circuits WCC1, WCC2 ... WCCn-1 and WCCn.

The first input ports of the wavelength converting circuits WCC1 to WCCn−1 are respectively connected to the first output ports of the optical switches SW1 to SWn−1, and the wavelength converting circuit WCCn is directly connected to the wavelength converter WCn. The wavelength converting circuits WCC1 to WCCN convert the converted optical signals from the wavelengths λ1, λ2, . . . λn−1 and λn to the original wavelength λ0, and produce restored optical signals from the converted optical signals. As described hereinbefore, the controller 5 causes the optical switching unit 4 to retard the converted optical signals by respective delay times. For this reason, the restored optical signals are sequentially output from the second wavelength converter 3b, and are supplied to the third optical multiplexer 6.

The third optical multiplexer 6 has n input ports and a single output port. The wavelength converting circuits WCC1 to WCCn are respectively connected to the input ports of the third optical multiplexer 6, and the restored optical signals are multiplexed. Thus, the third optical multiplexer 6 forms the multiple output optical signal from the restored optical signals.

The second output ports of the optical switches SW1 to SWn−1 are connected to the input ports of the second optical multiplexer 1b. As described herein-before, the controller 5 selectively changes the optical switches SW1 to SWn1 from the second output ports to the first output ports depending upon the lapse of time. For this reason, the converted optical signals are selectively transferred to the input ports of the second optical multiplexer 1b. The second optical multiplexer 1b multiplexes the converted optical signals selectively transferred to the input ports thereof so as to form the multiple intermediate optical signals. For this reason, the multiple intermediate optical signals are different in wavelength component from one another. The multiple intermediate optical signals are successively output from the second optical multiplexer 1b at the timings when the controller selectively changes the optical paths in the optical switches SW1 to SWn−1.

The waveguide 7 serves as a delay line. The waveguide 7 is adjusted to a length proper to introduce a time delay approximately equal to the time slot. For this reason, each multiple intermediate optical signal is delayed from the previous multiple intermediate signal by a time equal to the time slot. In other words, when a part of the multiple input optical signal reaches the first optical multiplexer 1a, the part of the multiple input optical signal in one time slot is converted to one of the multiple intermediate optical signals through the optical demultiplexer 2, the first wavelength converter 3a, the associated optical switch and the second optical multiplexer, and returns to the first optical multiplexer 1a as the multiple intermediate optical signal at the beginning of the next time slot.

Figure 4A:
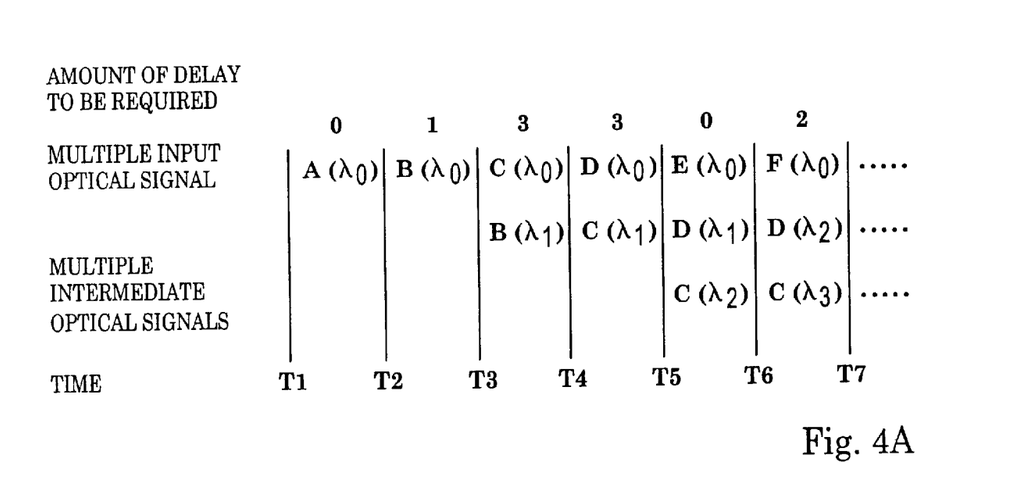
FIG. 4A is a view showing pieces of data information on a multiple input optical signal arriving at the optical delay circuit and multiple intermediate optical signals.
Figure 4B:
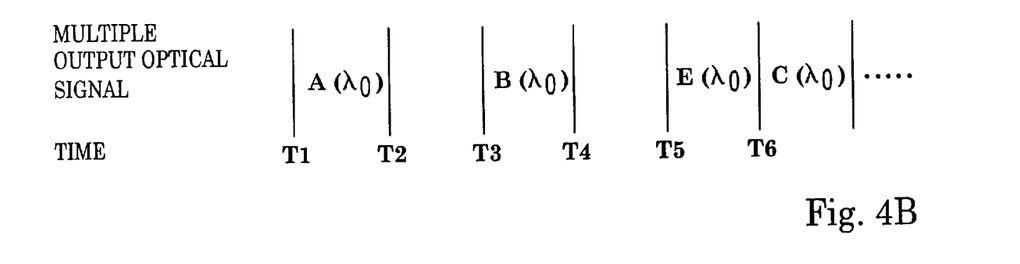
FIG. 4B is a view showing the pieces of data information output from the optical delay circuit.

Subsequently, description is made on the behavior of the optical delay circuit with reference to FIGS. 4A and 4B. FIG. 4A illustrates pieces of data information on the multiple input optical signal and the multiple intermediate optical signals sequentially delayed, and FIG. 4B illustrates the pieces of data information on the multiple output optical signal. The multiple input optical signal carries the pieces of data information respectively labeled with A, B, C, D, E and F, and the time slots are defined between times T1, T2, T3, T4, T5, T6 and T7. The pieces of data information A, B, C, D, E and F are respectively carried on parts of the multiple input optical signal and, accordingly, the parts of the multiple input optical signal have a wavelength at λ0. The pieces of data information A to F are respectively assigned to the time slots T1-T2, T2-T3, T3-T4, T4-T5, T5-T6 and T6-T7.

The optical delay circuit is expected to transfer the pieces of data information A and E without any delay time and to introduce delay times into propagation of the pieces of data information B, C, D and F. The amount of delay is different between the piece of data information B, the pieces of data information C/D and the piece of data information F. The amount of delay for the piece of data information B is as long as the time slot, and is represented by "1". The amount of delay for each of the pieces of data information C/D is three times as long as the time slot, and is represented by "3". The amount of delay for the piece of data information F is twice as long as the time slot, and is represented by "2". For this reason, the controller 5 stores the pieces of control data information respectively representative of the delay times "0", "1 ", "3", "3", "0" and "2" for the pieces of data information A, B, C, D, E and F.

The piece of data information A reaches the first optical multiplexer 1a between time T1 and time T2, and is multiplexed with the multiple intermediate optical signal. No piece of data information is presently carried on the multiple intermediate optical signal, and the first multiplexer 1a supplies the multiplexed optical signal carrying the piece of data information A to the demultiplexer 2. The demultiplexer 2 outputs the demultiplexed optical signal at wavelength λ0, and the demultiplexed optical signal at wavelength λ0 is supplied to the wavelength converting circuit WC1. The wavelength converting circuit WC1 converts the demultiplexed optical signal from the wavelength λ0 to the wavelength λ1, and supplies the converted optical signal at wavelength λ1 to the optical switch SW1. The controller 5 checks the piece of control data information to see how long the piece of data information A is to be delayed. As described hereinbefore, the amount of delay for the piece of data information A is zero. The controller 5 instructs the optical switch SW1 to connect the input port to the first output port. For this reason, the optical switch SW1 transfers the converted optical signal to the wavelength converting circuit WCC1, and the wavelength converting circuit WCC1 converts the converted optical signal from the wavelength λ1 to the wavelength λ0. Thus, the second wavelength converter 3b produces the restored optical signal at wavelength λ0 from the converted optical signal at wavelength λ1. The restored optical signal is supplied to the third optical multiplexer 6. Only the restored optical signal carrying the piece of data information A reaches the third optical multiplexer 6, and the piece of data information A is assigned to the time slot between time T1 and time T2 on the output optical signal line (see FIG. 4B).

The next piece of data information B reaches the first optical multiplexer between time T2 and time T3, and is multiplexed with the multiple intermediate optical signal. No piece of data information is presently carried on the multiple intermediate optical signal, and the first multiplexer 1a supplies the multiplexed optical signal carrying the piece of data information B to the demultiplexer 2. The demultiplexer 2 outputs the demultiplexed optical signal at wavelength λ0, and the demultiplexed optical signal at wavelength λ0 is supplied to the wavelength converting circuit WC1. The wavelength converting circuit WC1 converts the demultiplexed optical signal from the wavelength λ0 to the wavelength λ1, and supplies the converted optical signal at wavelength λ1 to the optical switch SW1. The controller 5 checks the piece of control data information to see how long the piece of data information B is to be delayed. As described hereinbefore, the amount of delay for the piece of data information B is "1". The controller 5 instructs the optical switch SW1 to connect the input port to the second output port. For this reason, the optical switch SW1 transfers the converted optical signal to the second optical multiplexer 1b. Only the converted optical signal at wavelength λ1 is supplied to the second optical multiplexer 1b, and the second optical multiplexer 1b outputs the multiple intermediate optical signal at wavelength λ1. The waveguide 7 propagates the multiple intermediate optical signal at wavelength λ1 from the second optical multiplexer 1b to the first optical multiplexer 1a, and introduces the time delay equal to the single time slot into the propagation from the second optical multiplexer 1b to the first optical multiplexer 1a. For this reason, the multiple output optical signal does not carry any piece of data information in the time slot between time T2 and time T3.

The third piece of data information C reaches the first optical multiplexer 1a between time T3 and time T4, and the multiple intermediate optical signal at wavelength λ1 concurrently reaches the first optical multiplexer 1a. The part of the multiple input optical signal representative of the piece of data information C is multiplexed with the multiple intermediate optical signal representative of the piece of data information B. The first optical multiplexer 1a supplies the multiplexed optical signal representative of the pieces of data information B and C to the optical demultiplexer 2. The multiplexed optical signal is demultiplexed into the demultiplexed optical signal representative of the piece of data information B at wavelength λ1 and the demultiplexed optical signal representative of the piece of data information C at wavelength λ0, and the demultiplexed optical signals are supplied to the wavelength converting circuits WC1 and WC2, respectively. The wavelength converting circuits WC1 and WC2 convert the demultiplexed signals from the wavelengths λ0 and λ1 to the wavelengths λ1 and λ2, and the converted optical signal at wavelength λ1 and the converted optical signal at wavelength λ2 are supplied to the optical switches SW1 and SW2, respectively. The controller 5 checks the pieces of control data information to see how long the pieces of data information B and C are to be delayed. The amount of delay for the piece of data information C is "3", and the controller 5 instructs the optical switch SW1 to connect the input port to the second output port. For this reason, the optical switch SW1 transfers the converted optical signal representative of the piece of data information C at wavelength λ1 to the second optical multiplexer 1b. On the other hand, the amount of delay for the piece of data information B is "1", and the delay time is expired at time T3. The controller 5 instructs the optical switch SW2 to connect the input port to the first output port, and the optical switch SW2 transfers the converted optical signal representative of the piece of data information B at wavelength λ2 to the wavelength converting circuit WCC2. The wavelength converting circuit WCC2 converts the converted optical signal representative of the piece of data information B from the wavelength λ2 to the wavelength λ0, and supplies the restored optical signal representative of the piece of data information B at wavelength λ0 to the third optical multiplexer 6. Only the restored optical signal representative of the piece of data information B reaches the third optical multiplexer 6, and the piece of data information B is carried on the part of the multiple output optical signal in the time slot between time T3 and time T4.

The second optical multiplexer 1b supplies the multiple intermediate optical signal representative of the piece of data information C at wavelength λ1 to the first optical multiplexer 1a. The multiple intermediate optical signal representative of the piece of data information C at wavelength λ1 reaches the first optical multiplexer 1a between time T4 and time T5.

The fourth piece of data information D reaches the first optical multiplexer 1a, and the part of the multiple input optical signal representative of the piece of data information D is multiplexed with the multiple intermediate optical signal representative of the piece of data information C. For this reason, the multiplexed optical signal represents the piece of data information D at wavelength λ0 and the piece of data information C at wavelength λ1. The optical demultiplexer 2 separates the multiplexed optical signal into the demultiplexed optical signal representative of the piece of data information D at wavelength λ0 and the demultiplexed optical signal representative of the piece of data information C at wavelength λ1. The demultiplexed optical signals are supplied to the first wavelength converter 3a, and the first wavelength converter 3a converts the demultiplexed optical signals representative of the pieces of data information C and D to the converted optical signal representative of the piece of data information C at wavelength λ2 and the converted optical signal representative of the piece of data information D at wavelength λ1. These converted optical signals are supplied to the optical switches SW1 and SW2, respectively. The controller 5 checks the pieces of control data information to see whether or not the delay times for the pieces of data information C and D are expired. The answer is negative at time T4. For this reason, the controller 5 instructs the optical switches SW1 and SW2 to connect the input ports to the second output ports, and the converted optical signals are transferred to the second optical multiplexer 1b. As a result, the multiple output optical signal does not carry any piece of data information in the time slot between time T4 and time T5.

The second optical multiplexer 1b multiplexes the converted optical signal representative of the piece of data information D at wavelength λ1 with the converted optical signal representative of the piece of data information C at wavelength λ2, and supplies the multiple intermediate optical signal representative of the pieces of data information C and D to the first optical multiplexer 1a. The multiple intermediate optical signal is propagated through the waveguide 7, and the waveguide introduces the time delay into the propagation of the multiple intermediate optical signal.

The fifth piece of data information E reaches the first optical multiplexer 1a between time T5 and time T6. The first optical multiplexer 1a supplies the multiplexed optical signal representative of the pieces of data information C, D and E to the demultiplexer 2. The multiplexed optical signal is separated into the demultiplexed optical signal representative of the piece of data information E at wavelength λ0, the demultiplexed optical signal representative of the piece of data information D at wavelength λ1 and the demultiplexed optical signal representative of the piece of data information C at wavelength λ2. The demultiplexed optical signals are respectively supplied to the wavelength converting circuits WC1, WC2 and WC3, and are converted to the converted optical signal representative of the piece of data information E at wavelength λ1, the converted optical signal representative of the piece of data information D at wavelength λ2 and the converted optical signal representative of the piece of data information C at wavelength λ3, respectively. The converted optical signals are supplied to the optical switches SW1, SW2 and SW3, respectively.

The controller checks the pieces of control data information to see whether or not the pieces of data information C, D and E are appropriately delayed. The piece of data information E is to be delayed by zero. However, the other pieces of data information C and D are to be further delayed.

For this reason, the controller 5 instructs the optical switches SW2 and SW2+1 to connect the input ports to the second output ports, and the converted optical signals representative of the pieces of data information C and D are transferred to the second optical multiplexer 1b. The controller 5 further instructs the optical switch SW1 to connect the input port to the first output port, and the converted optical signal representative of the piece of data information E is transferred to the wavelength converter WCC1. The wavelength converter WCC1 converts the converted optical signal to the restored optical signal representative of the piece of data information E at wavelength $\lambda 1$ and the restored optical signal is supplied to the third optical multiplexer 6. The third optical multiplexer 6 puts the piece of control data information E in the time slot between time T5 and time T6.

The second optical multiplexer 1b multiplexes the converted optical signal representative of the piece of data information D at wavelength $\lambda 2$ with the converted optical signal representative of the piece of data information C at wavelength $\lambda 3$, and supplies the multiple intermediate optical signal representative of the pieces of data information C and D to the waveguide 7. The waveguide 7 introduces the time delay into the propagation of the multiple intermediate optical signal, and the multiple intermediate optical signal reaches the first optical multiplexer between time T6 and time T7.

The sixth piece of data information F reaches the first optical multiplexer 1a between time T6 and time T7, and the multiple intermediate optical signal is multiplexed with the part of the multiple input optical signal representative of the piece of data information F at wavelength $\lambda 0$. The multiplexed optical signal is representative of the piece of data information F at wavelength $\lambda 0$, the piece of data information D at wavelength $\lambda 2$ and the piece of data information C at wavelength $\lambda 3$, and is supplied to the optical demultiplexer 2.

The optical demultiplexer 2 separates the multiplexed optical signal into the demultiplexed optical signal representative of the piece of data information F at wavelength $\lambda 0$, the demultiplexed optical signal representative of the piece of data information D at wavelength $\lambda 2$ and the demultiplexed optical signal representative of the piece of data information C at wavelength $\lambda 3$. These demultiplexed optical signals are supplied to the wavelength converting circuits WC1, WC2+1 and WC2+2, respectively, and are converted to the converted optical signal representative of the piece of data information F at wavelength $\lambda 1$, the converted optical signal representative of the piece of data information D at wavelength $\lambda 3$ and the converted optical signal representative of the piece of data information C at wavelength $\lambda 4$. The converted optical signals are supplied to the optical switches SW1, SW2+1 and SW2+2, respectively.

The controller 5 checks the pieces of control data information to see whether the pieces of data information F, D and C are appropriately delayed. Only the delay time for the piece of control data information C is expired. However, the other pieces of data information F and D are to be still delayed. For this reason, the controller 5 instructs the optical switches SW1 and SW2+1 to connect the input ports to the second output ports and the optical switch SW2+2 to connect the input port to the first output port. As a result, the only the converted optical signal representative of the piece of data information C is converted to the restored optical signal representative of the piece of data information C at wavelength $\lambda 0$, and the third optical multiplexer 6 puts the piece of data information C into the time slot between time T6 and time T7.

The converted optical signals representative of the pieces of control data F and D are transferred to the second optical multiplexer 1b, and the second optical multiplexer 1b produces the multiple intermediate optical signal representative of the piece of data information F at wavelength $\lambda 1$ and the piece of data information D at wavelength $\lambda 3$. The waveguide 7 introduces the delay time into the propagation of the multiple intermediate optical signal from the second optical multiplexer 1b and the first optical multiplexer 1a.

Thus, the optical delay circuit according to the present invention retards the pieces of data information, and produces the multiple output optical signal carrying all the pieces of data information. The first multiplexer 1a, the demultiplexer 2, the first wavelength converter 3a, the second optical multiplexer 1b and the waveguide 7 as a whole constitute an optical path. The second wavelength converter 3b and the third multiplexer 6 form in combination an output optical means.

As will be appreciated from the foregoing description, the controller steers the optical switches SW1 to SWn−1 so as to selectively transfer the pieces of data information A, B, C, D, E and F through the second wavelength converter 3b to the third optical multiplexer 6. The waveguide 7 is repeatedly used for introducing the time delay. Even if a long delay time is required, the waveguide 7 is available for the delay. Thus, the small optical delay circuit is obtained in accordance with the present invention.

Although particular embodiments of the present invention have been shown and described, it will be apparent to those skilled in the art that various changes and modifications may be made without departing from the spirit and scope of the present invention. For example, the controller 5 may change the delay times.

In the above-described embodiment, the multiple input optical signal is equal in wavelength to the multiple output optical signal. However, another optical delay circuit according to the present invention may introduce delay times between the parts of a multiple input optical signal at a certain wavelength and corresponding parts of a multiple output optical signal at another wavelength.

The pieces of control data information representative of the delay times may be rewritable.

What is claimed is:

1. An optical delay circuit for successively introducing delay times that are respectively equal to multiples of a unit time between parts of an input optical signal and an output optical signal, comprising:

a first optical multiplexer having a first input port successively supplied with said parts of said input optical signal representative of pieces of data information at a predetermined wavelength and a second input port successively supplied with intermediate optical signals each representative of none of or at least one of said pieces of data information at another wavelength different from said predetermined wavelength in synchronism with said parts of said input optical signal and an output port for outputting a multiplexed optical signal representative of the piece of data information of one of said parts of said input optical signal at said predetermined wavelength and said at least one of said pieces of data information at said another wavelength;

an optical demultiplexer having an input port connected to said output port of said first optical multiplexer and plural output ports, for outputting plural demultiplexed optical signals representative of said one of said pieces of data information at said predetermined wavelength and said at least one of said pieces of data information at said another wavelength;

a first wavelength converter having input ports respectively connected to said output ports of said optical demultiplexer, for converting said plural demultiplexed optical signals to converted optical signals at said another wavelength and yet another wavelength different from said predetermined wavelength and said another wavelength;

an optical switching unit having input ports respectively connected to output ports of said first wavelength converter, and having first output ports and second output ports connectable to said input ports, and being responsive to an instruction so as to selectively connect said input ports to said first output ports and said second output ports;

a second wavelength converter having input ports selectively connected to said first output ports of said optical switching unit and having an input connected to one of said output ports of said first wavelength converter, and converting said converted optical signals to restored optical signals respectively representative of said pieces of data information at said predetermined wavelength;

a second optical multiplexer having input ports respectively connected to said second output ports of said optical switching unit, and successively producing said intermediate optical signals from converted optical signals selectively supplied from said second output ports of said optical switching unit;

a third optical multiplexer having input ports respectively connected to output ports of said second wavelength converter, and producing said parts of said output optical signal from said restored optical signals;

a waveguide connected between an output port of said second optical multiplexer and said second input port of said first optical multiplexer, and introducing a delay time approximately equal to said unit time into the propagation of each of said intermediate optical signals from said second optical multiplexer to said first optical multiplexer; and a controller storing pieces of control data information representative of said delay times, and checking said pieces of control data information to control an optical loop consisting of said first optical multiplexer, said optical demultiplexer, said first wavelength converter, said optical switching unit, said second optical multiplexer and said waveguide to delay said pieces of data information by said delay times, respectively, by instructing said optical switching unit to selectively change respective optical connections from said first output ports to said second output ports.

2. The optical delay circuit as set forth in claim 1, in which said input optical signal and said output optical signal are assigned to a frame on an input optical line connected to said first optical multiplexer and a frame on an output optical line connected to said third optical multiplexer, and said frame on said input optical line and said frame on said output optical line are divided into time slots respectively assigned to said parts of said input optical signal respectively representative of said pieces of data information and into time slots to be assigned to said parts of said output optical signal selectively assigned to said pieces of data information.

3. The optical delay circuit as set forth in claim 1, in which each of said time slots on said input optical line is equal in length to each of said time slots on said output optical line, and said unit time is approximately equal to one of said time slots.

4. The optical delay circuit as set forth in claim 3, in which said first wavelength converter includes first wavelength converting circuits respectively connected to said input ports of said first wavelength converter for converting each of input wavelengths to corresponding different wavelengths.

5. The optical delay circuit as set forth in claim 4, in which said optical switching unit includes plural optical switches each having one of said input ports, one of said first output ports and one of said second output ports, said plural optical switches being respectively connected to one of said first wavelength converting circuits, and said controller independently changing the optical paths between said first output ports and said second output ports.

6. The optical delay circuit as set forth in claim 5, said second wavelength converter including second wavelength converting circuits for converting received wavelengths to said predetermined wavelength.

7. The optical delay circuit as set forth in claim 1, in which said input optical signal is equal in wavelength to said output optical signal.

8. A method for introducing time delays equal to different multiples of a unit time between parts of an input optical signal and parts of an output optical signal, comprising the steps of:

a) multiplexing at a first multiplexer one of said parts of said input optical signal representative of any one of pieces of data information with an intermediate optical signal representative of none of or at least one of said pieces of data information at another wavelength to produce a multiplexed optical signal representative of said any one of said pieces of data information at a predetermined wavelength and said none of or at least one of said piece of data information at said another wavelength;

b) demultiplexing said multiplexed optical signal into plural demultiplexed optical signals representative of said any one of said pieces of data information at said predetermined wavelength and said none of or at least one of said pieces of data information at said another wavelength;

c) converting said demultiplexed optical signals at said predetermined wavelength and said another wavelength to converted optical signals at said another wavelength and yet another wavelength;

d) checking said converted optical signals to see whether any one of said converted optical signals is delayed by an associated one of said delay times;

e) transferring said any one of said converted optical signals to a second wavelength converter with a positive answer at said step d) and to a second multiplexer with a negative answer at said step d);

f) multiplexing said any one of said converted optical signals transferred to said second multiplexer at said step e) with another of said converted optical signals by means of said second multiplexer to produce said intermediate optical signal;

g) propagating said intermediate optical signal from said second multiplexer through a waveguide to said first multiplexer to introduce a unit delay time equal to said unit time during the propagation; and h) converting said any one of said converted optical signals to a restored optical signal at said predetermined wavelength by means of said second wavelength converter without execution of said steps f) and g) to produce one of said parts of said output optical signal when said answer at said step e) is positive.

9. An optical delay circuit for selectively introducing delay times different from one another between pieces of input optical data and pieces of output optical data, comprising:

an optical path for circulating pieces of input optical data, and introducing a delay time during each circulation of a piece of input optical data;

an output optical means for outputting said pieces of output optical data;

an optical switching means inserted into said optical path, and connected to said output optical means; and a controller storing pieces of control data respectively representative of said delay times to be introduced for each piece of input optical data, and checking said pieces of control data to see whether said optical path has delayed said pieces of input optical data by corresponding delay time assigned thereto, such that when a piece of input optical data has been delayed by a corresponding delay time by circulation through said optical path, said controller instructs said optical switching means to transfer said piece of input optical data to said output optical means.

* * * * *